Patented May 25, 1937

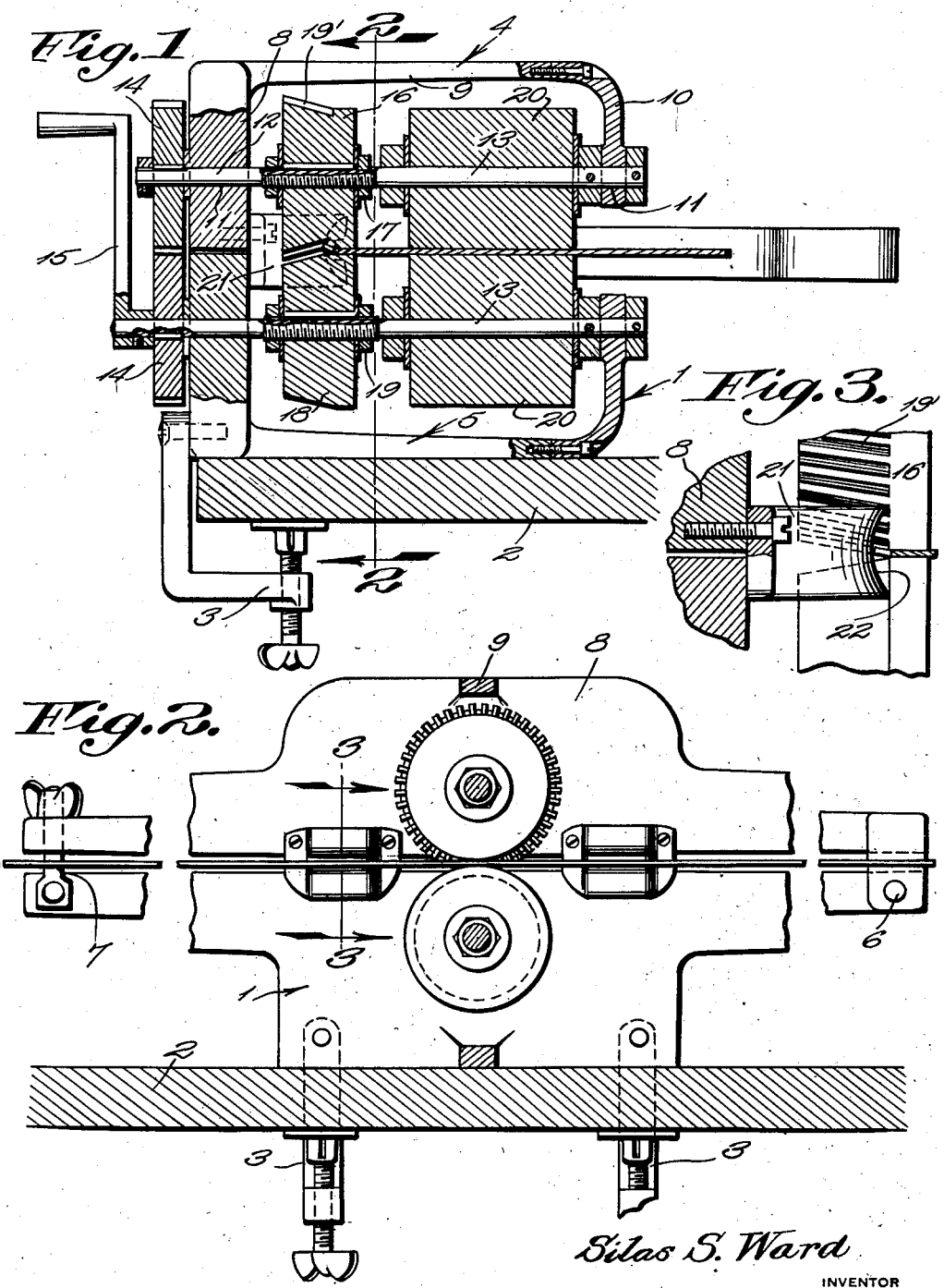

2,081,782

UNITED STATES PATENT OFFICE 2,081,782

HAND SAW SET

Silas S. Ward, Oak Grove, La.

Application May 15, 1936, Serial No. 79,989

1 Claim. (Cl. 76—59)

This invention relates to saw sets, and has for the primary object the provision of a device of this character which will be easy and quick to operate and will accurately and rapidly set teeth of a saw and may be readily adjusted for setting teeth of saws at different pitches.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a saw set constructed in accordance with my invention.

Figure 2 is a transverse sectional view taken on the line 2—2 of Figure 1.

Figure 3 is a detail sectional view taken on the line 3—3 of Figure 2.

Referring in detail to the drawing, the numeral 1 indicates a frame detachably secured to a support 2 by clamps 3. The frame 1 consists of companion sections 4 and 5. The sections 4 and 5 are hingedly connected, as shown at 6. When the frame is adapted to the support 2 the section 5 becomes fixed while the section 4 is movable relative to the section 5 and may be held in an operative and non-movable position by a bolt 7. Each section is composed of an end member 8 and an arm 9 to which is detachably secured a curved member 10, terminating in a bearing 11. The end member 8 is apertured to form a journal 12 aligning with the bearing 11. The journals 12 and bearings 11 rotatably support shafts 13 connected by gears 14 when the sections 4 and 5 are arranged in operative relation. One of the shafts has detachably secured thereto a crank handle 15. The shaft 13 of the section 4 has splined thereto a saw set wheel 16 adjustable endwise of said shaft by a nut 17 having threaded engagement with the respective shaft. The shaft 13 of the section 5 has keyed thereto an anvil 18 also adjustable endwise of said shaft by nuts 19 having threaded engagement with the respective shaft. Thus it will be seen that the set wheel and anvil may be readily adjusted for the purpose of setting teeth of saws to different pitches. The set wheel 16 has teeth 19' defining notches therebetween. The set wheel to set an eight point saw must have four teeth and four notches to the inch so that the teeth will set the teeth of the saw and the notches straddle the teeth which are not being acted on at that operation. It is to be understood that one group of teeth of the saw are set in one operation and then the saw is turned over and passed through the device a second time to set the other group of teeth.

Cushion supporting rollers 20 are journaled on the shafts 13 between which moves the saw blade. The rollers 20 support the blade in proper position to have the teeth thereof acted upon by the set wheel 16 and the anvil 18. Companion guards 21 are secured to the end members 8 of the sections 4 and 5 of the frame to be abutted by the ends of the teeth of the saw so that the saw blade will be guided through the device and the teeth thereof set to a desired pitch. By adjusting the set wheel 16 and the anvil 18 towards and from the guards 21 the amount of set of the teeth of the saw may be varied. The teeth engaging faces of the guards are concaved, as shown at 22. In operation, the set wheel 16 and anvil 18 are rotated by the crank handle 15 and as the teeth of the saw pass between the set wheel and the anvil one group of teeth are properly set. After this operation the saw blade is turned over and again passed through the device or acted upon by the set wheel and anvil. Thus it will be seen that all teeth of a saw blade are accurately and rapidly set to a desired pitch.

The curved members 10 being detachable from the arms 9, will permit the shafts 13 and elements carried thereby to be easily and quickly removed from the device when it is desired to substitute the saw set wheel and anvil for others which differ in size.

Having described the invention, I claim:

A saw set comprising a frame mounted to a support and including hingedly connected sections, fastening means between said sections for releasably securing them in operative relation, shafts journaled to said sections, gearing between said shafts, means for rotating one of the shafts, a set wheel secured to one of the shafts, an anvil secured to the other shaft cooperating with the set wheel in setting teeth of a saw blade, cushion rollers mounted on said shafts to support the saw blade, guards secured to the frame to be contacted by the teeth of the saw blade during the setting operation of the teeth, and means for adjusting the set wheel and anvil endwise of the shafts and towards and from the guards.

SILAS S. WARD.